United States Patent [19]
Kress et al.

[11] Patent Number: 6,033,159
[45] Date of Patent: Mar. 7, 2000

[54] MATERIAL-REMOVING PRECISION MACHINING TOOL

[75] Inventors: Dieter Kress, Aalen; Friedrich Haberle, Lauchheim, both of Germany

[73] Assignee: Mapal Fabrik fur Prazionswerk-Zeuge Dr. Kress KG, Aalen, Germany

[21] Appl. No.: 09/142,151
[22] PCT Filed: May 24, 1997
[86] PCT No.: PCT/EP97/02669
  § 371 Date: Sep. 2, 1998
  § 102(e) Date: Sep. 2, 1998
[87] PCT Pub. No.: WO97/45223
  PCT Pub. Date: Dec. 4, 1997

[30] Foreign Application Priority Data

May 25, 1996 [DE] Germany ............... 196 21 295

[51] Int. Cl.⁷ ............................................. B23B 51/00
[52] U.S. Cl. ......................... 408/83; 408/199; 408/227
[58] Field of Search ............................ 408/81, 82, 83, 408/199, 223, 227, 713

[56] References Cited

U.S. PATENT DOCUMENTS

| | | | |
|---|---|---|---|
| 4,076,445 | 2/1978 | Kress et al. | 408/226 |
| 4,133,399 | 1/1979 | Herrmann | 175/384 |
| 4,184,794 | 1/1980 | Henninghaus | 408/83 |
| 4,264,246 | 4/1981 | Lowis et al. | 408/81 |
| 5,125,772 | 6/1992 | Kress | 408/57 |

FOREIGN PATENT DOCUMENTS

| | | |
|---|---|---|
| 2549260 | 5/1977 | Germany . |
| 2556977 | 6/1977 | Germany . |
| 7726025 | 11/1977 | Germany . |
| 2910828 | 9/1980 | Germany . |
| 3429498 | 2/1986 | Germany . |
| 3807224 | 4/1989 | Germany . |
| 4329553 | 3/1995 | Germany . |
| 658510 | 10/1951 | United Kingdom ............ 408/227 |

*Primary Examiner*—Daniel W. Howell
*Attorney, Agent, or Firm*—Ostrolenk, Faber, Gerb & Soffen, LLP

[57] ABSTRACT

A reamer for material-removing finishing machining of drilled surfaces in workpieces made of metal. The reamer has a blade insert and two guide bars associated with the blade insert. The first guide bar trails the blade insert, as seen in the direction of rotation of the reamer, by approximately 40° and the second guide bar is arranged opposite the blade insert. The reamer has at least one additional blade insert that leads the second guide bar by approximately 40°.

25 Claims, 2 Drawing Sheets

MATERIAL-REMOVING PRECISION MACHINING TOOL

BACKGROUND OF THE INVENTION

The invention relates to a reamer for the material-removing finishing machining of drilled surfaces in workpieces made of metal.

Tools, in particular reamers, of the type discussed here are distinguished by the fact that a blade insert is assigned a diametrically opposite guide bar, with the machining diameter of the tool being determined by the blade insert and the guide bar. To stabilize the tool inside the drilled hole, a further guide bar is provided, which trails the blade insert—as seen in the direction of rotation of the tool—by approx. 40°. Tools of the type described here allow drilled surfaces to be finish-machined so as to achieve a high level of dimensional accuracy and a high surface quality. The disadvantage has emerged that the cutting power of the tool is frequently insufficient even when the operating speed is increased.

SUMMARY OF THE INVENTION

The object of the invention is to provide a reamer for the material-removing finishing machining of drilled surfaces which does not have these drawbacks.

It is proposed to achieve this object by means of a reamer of the type mentioned at the outset which is distinguished by the fact that the basic arrangement of the first blade insert and the two associated guide bars is retained and that an additional blade insert is provided. In order to ensure optimum support for the tool in the drilled hole to be machined, the additional blade insert is arranged ahead of the guide bar situated opposite the first blade insert, and spacing ahead of an angle of 20° to 50°, in particular of 30° to 45°, has proven advantageous. An angle of lead of approximately 40° has proven particularly suitable. This arrangement ensures that the guide bar situated opposite the first blade insert trails the second blade insert by approximately 40°. Consequently, two blade inserts and two guide bars which in each case trail the blade insert by 40° are provided in the reamer. Moreover, in a preferred embodiment of the reamer a further guide bar is provided diametrically opposite the second blade insert. A reamer of this nature is therefore distinguished by the fact that the, Y-shaped arrangement of one blade insert and two guide bars, which was already known, is now achieved in duplicate.

Moreover, in a preferred embodiment of the reamer the Y-shaped arrangement of one blade insert and two guide bars is assigned a third blade insert, which is arranged opposite the first guide bar which trails the first blade insert by approximately 40°.

In a further preferred embodiment of the reamer, the blade insert which lies opposite the first guide bar is assigned a further guide bar which trails by approximately 40°. In this way too, it is possible to achieve two Y-shaped arrangements of two blade inserts and in each case two guide bars.

Finally, in a preferred embodiment the reamer has three blade inserts, ensuring at least one Y-shaped basic arrangement of one blade insert and two associated guide bars.

BRIEF DESCRIPTION OF THE DRAWINGS

The invention will now be explained in more detail with reference to the drawings, in which.

DESCRIPTION OF PREFERRED EMBODIMENTS

Figure 1:
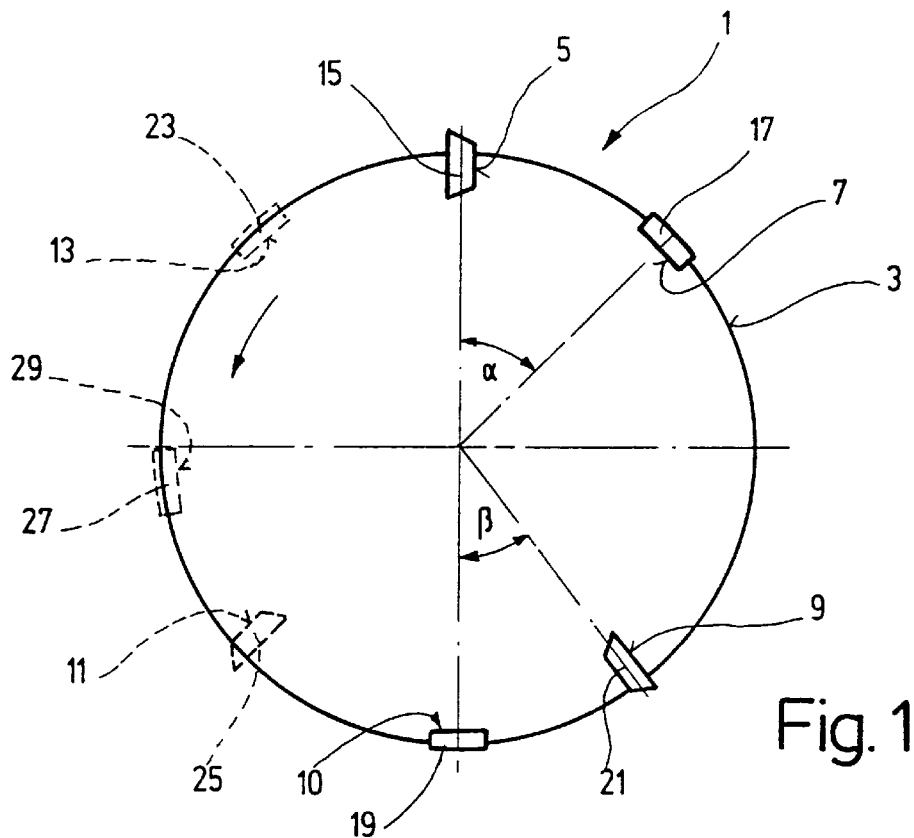
FIG. 1 shows a basic diagram of a front view of a tool with two or three cutting edges.

The basic in FIG. 1 shows a front view of a tool 1 which is preferably designed as a reamer. Grooves 5 to 13, into which cutting tips and guide bars are inserted in known manner, are formed in the circumferential surface 3 of the tool 1. A first blade insert 15—as seen in the direction of rotation of the tool leads a first guide bar 17 by an angle $\alpha$. Blade 15 is situated in the groove 5. The lead angle $\alpha$ may lie in a range from 20° to 50°. In particular an angle of from 30° to 45° is selected. An angle $\alpha$ of approximately 40° has proven particularly advantageous and is illustrated here in FIG. 1.

The first guide bar is inserted in the groove 7 and is fastened there in a suitable manner, for example by soldering or adhesive bonding.

The blade insert 15 is assigned a diametrically opposite second guide bar 19 which is inserted in the groove 10.

The first blade insert 15 and the associated guide bars 17 and 19 form a Y-shaped basic arrangement.

In this case, the tool 1 has a second blade insert 21, which is inserted in the groove 9 and is held there in a suitable manner. Fastening blade inserts is known. As a rule, crimping shoes are provided, which press the blade insert against a flank of the groove and in this way crimp it in place.

The second blade insert 21 is inserted in the circumferential surface 3 of the tool 1 in such a way that the second guide bar 19 trails the second blade insert 21 by an angle $\beta$ which may be from 20° to 50°, in particular approximately 30° to 45°. An angle $\beta$ of approximately 40° has proven particularly advantageous and is also shown in FIG. 1.

A third guide bar 23, which is shown in dashed lines and is inserted in the groove 13, may be arranged diametrically opposite to the second blade insert 21. Together with the second and third guide bars 19 and 23, the second blade insert 21 in turn forms a Y-shaped basic structure as is provided by the first blade insert 15, the first guide bar 17 and the second guide bar 19. The tool 1 illustrated here is therefore distinguished by Y-shaped arrangement of blade insert and guide bar being provided in duplicate, the second guide bar 19 being present both in the Y-shaped arrangement of the first blade insert 15 and also in the Y-shaped arrangement of the second blade insert 21.

Instead of the second blade insert 21, or in addition to this blade insert, a third blade insert 25, which is shown here in dashed lines and is accommodated in the groove 11, may be provided. This third blade insert 25 is preferably arranged diametrically opposite the first guide bar 17.

A fourth guide bar 27, which for its part is arranged in a groove 29, may be arranged so as to trail this third blade insert 25 by approximately 40°. The blade insert 25, together with the fourth guide bar 27 and with the first guide bar 17, in turn forms a Y-shaped arrangement.

After all, in this way it is possible to provide a Y-shaped arrangement of one blade insert and two guide bars, starting from the first blade insert 15, and to provide additional Y-shaped arrangements starting from the second blade insert 21 and/or from the third blade insert 25.

The tool 1 may therefore comprise, in addition to the first blade insert, as a further blade insert, the second blade insert 21 or the third blade insert 25 with the associated guide bars. In this way, a so-called two-edged tool is achieved. However, it is also conceivable to provide, in addition to the first blade insert 15, both the second blade insert 21 and the third blade insert 25, so as to form a three-edged tool with the associated guide bars. In order to ensure chatter-free operation during the finish machining of drilled surfaces, a Y-shaped basic structure must always be present, provided by the arrangement of one blade insert and two guide bars, in which case—as seen in the direction of rotation of the tool indicated by an arrow—a first guide bar trails the blade insert by 40° and a second guide bar trails by 180°. The second guide bar is therefore arranged diametrically opposite the blade insert. As well as the additional blade inserts, it is also possible to provide further guide bars, also forming one or two further Y-shaped arrangement structures in which single or a plurality of guide bars belong to a plurality of such arrangements.

Figure 2:
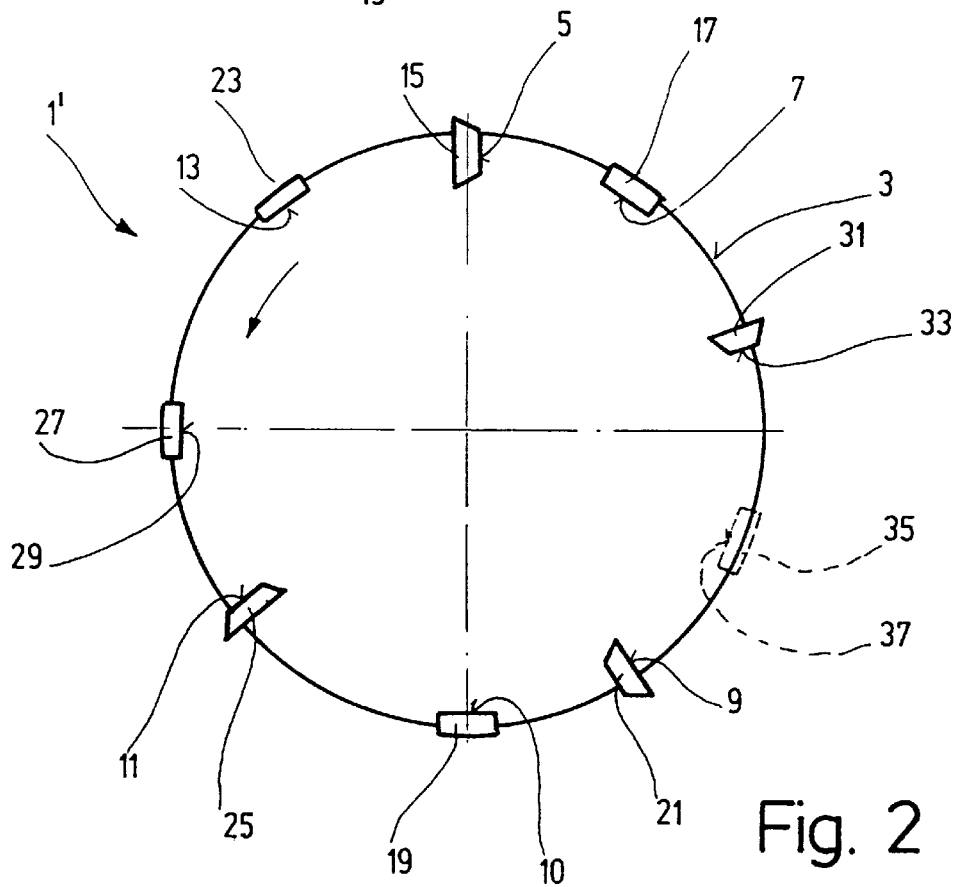
FIG. 2 shows a basic diagram of a front view of a tool with four cutting edges.

FIG. 2 again shows a basic diagram of a front view of a tool 1'. The basic structure of the tool corresponds to that which is depicted in FIG. 1, so that identical parts are provided with identical reference numerals. The tool depicted in FIG. 2 differs from that shown in FIG. 1 by the fact that a fourth blade insert 31, which is inserted in a suitable groove 33 arranged in the circumferential surface 3 of the tool 1', is provided. The tool shown here again has three Y-shaped arrangements of blade inserts and guide bars, the first blade insert 15 being assigned the guide bars 17 and 19, while the second blade insert 21 is assigned the guide bars 19 and 23 and the third blade insert 25 is assigned the guide bars 27 and 17. FIG. 2 shows in dashed lines that a fifth guide bar 35, which is arranged in a groove 37, may be arranged downstream of the fourth blade insert 31. As seen in the direction of rotation of the tool 1 indicated by an arrow, the fifth guide bar 35 is approximately 40° downstream of the fourth blade insert 31. Owing to the three Y-shaped arrangements of blade insert and guide bars which are already provided in this case, the tool 1 is guided and centered so successfully in the drilled hole to be machined that it is possible to dispense with a Y-shaped arrangement structure for the fourth blade insert 31. Moreover, it can be observed that the fourth guide bar 27 is arranged practically directly opposite the fourth blade insert 31, so that here too sufficient stabilization is provided.

Figure 3:
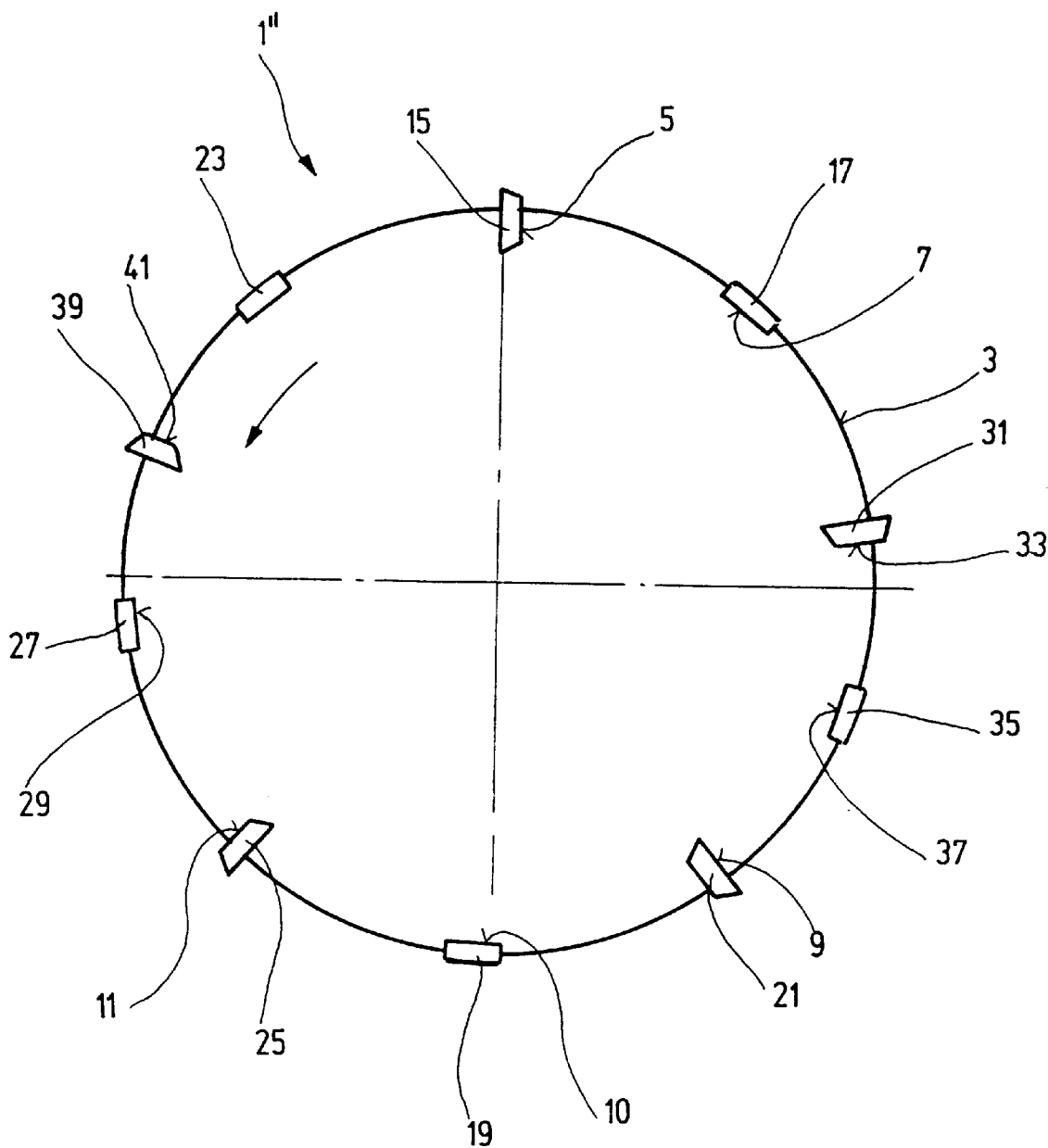
FIG. 3 shows a basic diagram of a front view of a tool with five cutting edges.

The basic diagram shown in FIG. 3 of a tool 1" shows an embodiment with five blade inserts or cutting edges. The cutting edges 1 to 4 correspond to those which are illustrated in FIG. 2. Therefore, to this extent reference is made to the description given with regard to FIG. 2. The guide bars 1 to 5 which are shown in FIG. 3 likewise correspond to those which have already been explained with reference to FIG. 2. The tool 1" illustrated here differs from the tool 1' shown in FIG. 2 only by the fact that a fifth blade insert 39, which is inserted in a suitable groove formed in the circumferential surface of the tool 1", is provided between the third guide bar 23 and the fourth guide bar 27. The third guide bar 23 trails the fifth blade insert 39—as seen in the direction of rotation indicated by an arrow—by approximately 40°, so that the basic arrangement which has already been mentioned with reference to the first blade insert 15 is also present for the fifth blade insert 39 and the third guide bar 23. The fifth guide bar 35 is arranged diametrically opposite the fifth blade insert 39, so that ultimately the Y-shaped arrangement which has already been explained with reference to the previous figures is also produced for the fifth blade insert 35.

The tool 1" shown in FIG. 3 has a plurality of such arrangements, the first blade insert 15 and the first guide bar 17, as well as the second guide bar 19, being assigned to one another, in the same way as the second blade insert 21, the second guide bar 19 and the third guide bar 23. A further arrangement is provided by the third blade insert 25, the fourth guide bar 27 and the guide bar 17. Finally, the last Y-shaped arrangement is provided by the above-mentioned fifth blade insert 39 together with the guide bars 23 and 35.

Owing to these arrangements, the tool 1" illustrated in FIG. 3 is guided optimally in the drilled surface which is to be machined.

The tools described here with reference to FIGS. 1 to 3 are distinguished by the fact that the advance of the tool inside a drilled hole to be machined can be significantly greater than with conventional tools. Tests have shown that the advance with a tool which has three cutting edges or blade inserts, as explained in FIG. 1, can be greater by a factor of 3 than with conventional tools. Correspondingly greater advance values result from the tools with 4 and 5 cutting edges.

Owing to the optimum support of the tool inside the drilled hole, the surface qualities and roundness values which are known to be achieved with reamers are maintained.

Ultimately, the tool described here is particularly suitable for the material-removing finishing and precision machining of drilled surfaces in workpieces made of metal. The number of cutting edges and guide bars which is selected depends, inter alia, on the diameter of the tool, since, as is known, it is necessary to assign to each cutting edge a leading—as seen in the direction of rotation—chip space, in order to ensure that the chips are removed successfully and hence to ensure fault-free operation of the tool.

The invention can be employed to particular advantage on reamers. Naturally, other tools used for the material-removing finishing machining of drilled surfaces in workpieces made of metal may also be designed in accordance with the teaching of the invention.

We claim:

1. A reamer for material-removing finishing machining of a drilled surface in a metal workpiece, the reamer comprising:

a circular reamer body with a circular surface; and a plurality of unequally spaced blade inserts and guide bars, including:

a first blade insert supported in the reamer body and projecting out from the surface, first and second guide bars at the surface and assigned to the first blade insert wherein the first guide bar trails the first blade insert in the direction of rotation by the reamer by approximately 40° and the second guide bar is positioned around the reamer body generally opposite the first blade insert; and a second blade insert supported in the reamer body and projecting out from the surface and located opposite the first guide bar.

2. The reamer of claim 1, wherein the first and second blade inserts are so placed and the respective ones of the guide bars associated with the first and second blade inserts are so placed as to define a respective Y-shaped arrangement including each blade insert and the two associated guide bars for each of the first and second blade inserts.

3. The reamer of claim 2, where at least one of the guide bars is part of both of the two respective Y-shaped arrangements including each one of the first and second blade inserts.

4. The reamer of claim 1, further comprising a third, a fourth and a fifth blade insert at spaced intervals around and projecting out from the surface of the reamer.

5. A reamer for material-removing finishing machining of a drilled surface in a metal workpiece, the reamer comprising:

a circular reamer body with a circular surface; and a plurality of unequally spaced blade inserts and guide bars, including:

a first blade insert supported in the reamer body and projecting out from the surface, first and second guide bars at the surface and assigned to the first blade insert wherein the first guide bar trails the first blade insert in the direction of rotation by the reamer by approximately 40° and the second guide bar is positioned around the reamer body generally opposite the first blade insert; and a second blade insert supported in the reamer body and projecting out from the surface and leading the second guide bar by an angular distance in the range of 20–50°.

6. The reamer of claim 5, further comprising a third guide bar located at the surface of the reamer and opposite the second blade insert.

7. The reamer of claim 5, further comprising a third, a fourth and a fifth blade insert at spaced intervals around and projecting out from the surface of the reamer.

8. A reamer for material-removing finishing machining of a drilled surface in a metal workpiece, the reamer comprising:

a circular reamer body with a circular surface; and a plurality of unequally spaced blade inserts and guide bars, including:

a first blade insert supported in the reamer body and projecting out from the surface, first and second guide bars at the surface and assigned to the first blade insert wherein the first guide bar trails the first blade insert in the direction of rotation by the reamer by approximately 40° and the second guide bar is positioned around the reamer body generally opposite the first blade insert;

a second blade insert supported in the reamer body and projecting out from the surface and leading the second guide bar by an angular distance in the range of 20–50°; and a third guide bar supported in the reamer body and projecting out from the surface and located opposite the second blade insert.

9. The reamer of claim 8, wherein the second blade insert leads the second guide bar by an angle in the range of 30–45°.

10. The reamer of claim 8, wherein the second blade insert leads the second guide bar by an angle of approximately 40°.

11. The reamer of claim 8, further comprising a third blade insert supported at the surface of the reamer and at a position opposite the first guide bar.

12. The reamer of claim 11, wherein the third guide bar leads the first blade insert by an angle in the range of 30–45°.

13. The reamer of claim 11, wherein the third guide bar leads the first blade insert by an angle of approximately 40°.

14. The reamer of claim 11, further comprising a fourth blade insert supported in the reamer body and projecting out from the surface and located to trail the first guide bar by an angle in the range of 20–50°.

15. The reamer of claim 14, wherein the fourth blade insert trails the first guide bar by an angle in the range of 30–45°.

16. The reamer of claim 14, wherein the fourth blade insert trails the first guide bar by an angle of approximately 40°.

17. The reamer of claim 11, wherein the first and second blade inserts are so placed and the respective ones of the guide bars associated with the first and second blade inserts are so placed as to define a respective Y-shaped arrangement including each blade insert and the two associated guide bars for each of the first and second blade inserts.

18. The reamer of claim 17, where at least one of the guide bars is part of both of the two respective Y-shaped arrangements including each one of the first and second blade inserts.

19. The reamer of claim 11, where at least one of the guide bars is part of the respective Y-shaped arrangements including each one of the first and second blade inserts.

20. The reamer of claim 11, further comprising a fourth guide bar located at the surface of the reamer and trailing by about 40° the third blade insert.

21. The reamer of claim 20, further comprising a fourth and a fifth blade insert at spaced intervals around and projecting out from the surface of the reamer.

22. The reamer of claim 5, wherein the first and second blade inserts are so placed and the respective ones of the guide bars associated with the first and second blade inserts are so placed as to define a respective Y-shaped arrangement including each blade insert and the two associated guide bars for each of the first and second blade inserts.

23. The reamer of claim 5, wherein the second blade insert leads the second guide bar by an angle in the range of 30–45°.

24. The reamer of claim 5, wherein the second blade insert leads the second guide bar by an angle of approximately 40°.

25. The reamer of claim 22, where at least one of the guide bars is part of both of the two respective Y-shaped arrangements including each one of the first and second blade inserts.

* * * * *